United States Patent
Wu et al.

(10) Patent No.: US 11,244,218 B1
(45) Date of Patent: Feb. 8, 2022

(54) POLARIZED RAMAN SPECTRUM CODING-BASED NANO BARCODE SMART LABEL

(71) Applicant: Nanjing University, Nanjing (CN)

(72) Inventors: Xinglong Wu, Nanjing (CN); Jiaqing Xu, Nanjing (CN); Jiancang Shen, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 17/335,570

(22) Filed: Jun. 1, 2021

(30) Foreign Application Priority Data

Jan. 8, 2021 (CN) .......................... 202110024169.0

(51) Int. Cl.
*G06K 19/06* (2006.01)

(52) U.S. Cl.
CPC .............................. *G06K 19/06028* (2013.01)

(58) Field of Classification Search
CPC ............................................... G06K 17/06028
USPC ...................................... 235/462.01
See application file for complete search history.

(56) References Cited

U.S. PATENT DOCUMENTS

| | | | | |
|---|---|---|---|---|
| 10,997,377 | B1* | 5/2021 | Livingston | B41J 11/00 |
| 2010/0050901 | A1* | 3/2010 | Bins | B42D 25/29 |
| | | | | 106/31.14 |
| 2011/0282021 | A1* | 11/2011 | Joo | H01J 37/317 |
| | | | | 526/256 |
| 2020/0199657 | A1* | 6/2020 | Win | C12Q 1/686 |

FOREIGN PATENT DOCUMENTS

| | | |
|---|---|---|
| CN | 102855510 A | 1/2013 |
| CN | 103186803 A | 7/2013 |
| CN | 107162036 A | 9/2017 |
| WO | WO2006006192 A1 | 1/2006 |

* cited by examiner

*Primary Examiner* — Allyson N Trail
(74) *Attorney, Agent, or Firm* — Bret E. Field; Bozicevic, Field & Francis LLP

(57) ABSTRACT

The present disclosure provides a polarized Raman spectrum-based nano barcode smart label, including: a substrate and a nanoparticle coding layer that is provided on the substrate and can be coded by polarized Raman spectrum coding, wherein the nanoparticle coding layer that can be coded by polarized Raman spectrum coding is a mixed layer including a plurality of nanomaterials having different Raman characteristic peaks; under different polarization detection states, the Raman characteristic peaks can exhibit coding characteristics that are totally different from those under a non-polarization detection state and are distinguished from those of a conventional Raman peak position, so as to achieve spectral characteristics for multiple coding. During use of the smart label of the present disclosure, a corresponding nano barcode detection system is used to detect a brand label provided with the encoded nanoparticles to obtain coding information of the brand label.

9 Claims, 5 Drawing Sheets

POLARIZED RAMAN SPECTRUM CODING-BASED NANO BARCODE SMART LABEL

FIELD OF THE PRESENT DISCLOSURE

The present disclosure belongs to the field of spectral information coding, and in particular relates to a polarized Raman spectrum-based nano barcode smart label.

BACKGROUND OF THE PRESENT DISCLOSURE

In the past few years, with the rapid development of nanotechnologies, the use of micro barcodes and nano barcodes in different fields has attracted widespread attention. There are generally two methods for making the nano barcodes. One is that microparticles are combined into a coding module, and most of coding interpretation is implemented through pattern recognition, so it is called "graphical method". For such nano barcodes, a common way is to cut particles into different shapes and sizes to generate different codes. And the other one is that micro particles are loaded with coding components including molecules or nanoparticles with an identifiable characteristic. A spectrum of a material has a specific shape, determined peak position and FWHM, and high sensitivity. At present, the most studied coding is spectral coding, of which fluorescence spectral coding and Raman spectral coding are mostly known.

A full width at half maximum (FWHM) value of a spectral peak of a fluorescence emission band of a conventional dye molecule is 50 to 200 nm. Meanwhile, within a visibly region (400 to 800 nm), only 4 to 6 different fluorescent dyes with suitable spectrum overlap can be provided for adjustment. Semiconductor nanocrystals may have smaller FWHM values of 10 to 20 nm in their fluorescence emission region. Therefore, 10 to 12 different kinds of nanocrystals can be applied to the same detection window. An FWHM value of a spectral peak of a Raman scattering band is further decreased to only one-tenth of that of the fluorescence emission peak, or even less. Therefore, it is theoretically possible to make more codes. For example, a typical Raman spectrometer may have a detection range of 40-4000 $cm^{-1}$, while an FWHM of a Raman spectrum signal of a common nanocrystal material is less than 10 $cm^{-1}$, thus theoretically the number of components that can be detected in a detection window is several hundreds.

So far, spectral coding methods have gradually matured, and patent applications related to corresponding research has also been applied for, such as Chinese invention patents CN1445712A entitled "Method for coding and decoding high-capacity information" and CN1987898A entitled "Digital coding method using material property, digital coding property material composition and preparing method thereof". In foreign countries, spectral coding has been preliminarily commercialized in some fields (drug detection); however, spectral coding for nanomaterials, especially Raman spectral coding for nanomaterials, is still in relatively preliminary stage at present. For example, Chinese patent No. 201310089733.2 discloses a Raman-spectrum-based nanometer bar code smart label and identification method which simply takes the presence or absence of Raman peaks into consideration and does not explore the relationship between the characteristics of Raman peaks and the structure and performance, thus does not have information capacity of Raman spectrum coding and multiple anti-counterfeiting functions. Researches are performed based on specific photoelectric properties of nanomaterial, and the properties are applied to a nano barcode smart label, so limitations on conventional spectrum coding can be broken through, an information capacity can be increased, regulation and multiple coding of spectral coding can be realized, and thus the security, privacy and information capacity of the nano barcode can be improved and wider practical applications can be obtained.

SUMMARY OF THE PRESENT DISCLOSURE

Objectives of the present disclosure are to provide a polarized Raman spectrum-based nano barcode smart label and a coding method thereof. A small amount of nanoparticles are used to form a coding carrier to store information, secondary coding can be performed according to a change of Raman spectrum of a nano barcode under different polarization detection state, so as to realize multiple anti-counterfeiting and store more information content.

In order to achieve the above objectives, the present disclosure provides a polarized Raman spectrum-based nano barcode smart label, including: a substrate and a nanoparticle coding layer that can be coded by polarized Raman spectrum coding and is provided onto the substrate, wherein a coding carrier of the nanomaterial coding layer is formed by a mixture of a group of nanomaterials, with a portion of or all of Raman characteristic peak states of these nanomaterials can exhibit obvious polarization characteristics in different polarization detection states.

Preferably, the obvious polarization characteristics exhibited by a portion of or all of the Raman characteristic peak states under different polarization detection states refer to obvious changes of a peak presence state, a peak position shift state, a peak intensity change state, and a peak FWHM change state at a specific position for some or all of Raman characteristic peaks of the nanomaterial under non-polarization (or polarization) optical excitation and different polarization detection states.

The present disclosure further provides a coding method of a nano barcode based on polarized Raman spectrum coding, including: collecting change information based on obvious changes presented by a peak presence state, a peak position shift, a peak intensity change state, and a peak FWHM at a specific position of a polarized Raman spectrum of a specific nanomaterial under different polarization detection sates, and performing coding according to one or more of the change information.

Specifically, according to one aspect, the present application provides a polarized Raman spectrum coding-based nano barcode smart label, which includes: a substrate and a nanomaterial coding layer that is provided on the substrate and can be coded by polarized Raman spectrum coding, wherein the nanomaterial coding layer includes a coding carrier that is formed by a mixture of a group of nanomaterials, and Raman characteristic peak states of the nanomaterials under different polarization detection states exhibit distinguishable polarization characteristics.

Optionally, when a Raman spectrum of the nanomaterial under a polarization detection state is compared with a Raman spectrum under a non-polarization detection state, Raman characteristic peak states at a specific position exhibit distinguishable polarization characteristics; or when Raman spectra of the nanomaterial under different polarization detection states are compared with each other, Raman characteristic peak state at a specific position exhibits distinguishable polarization characteristics.

Optionally, the distinguishable polarization characteristics of the Raman characteristic peak state at specific positions in the Raman spectrum include: a change of presence state, a shift of peak position, a change of peak intensity, or a change of peak FWHM of the Raman characteristic peak at the specific position in Raman spectrum information.

Optionally, the nanomaterials include one or more of SiGe alloy nanoparticles, $SnO_2$ nanoparticles, $CaF_2$ nanoparticles, $Y_2O_3$ nanoparticles, ZnO nanoparticles, Si nanoparticles, $SnO_2$ nanoparticles, and SiC nanoparticles.

Optionally, the substrate is one of paper products, plastic, textile, wood, bamboo timber, glass, and metal materials.

Optionally, the nanomaterial coding layer that can be coded by polarized Raman spectrum coding is assembled onto the substrate in the form of a one-dimensional barcode or a two-dimensional code by at least one of titration, printing, coating and industrial printing.

According to another aspect, the present application further provides a coding method of a nano barcode based on polarized Raman spectrum coding, including: obtaining Raman spectrum information of a nanomaterial used for coding in a nano barcode smart label under a non-polarization detection state; obtaining Raman spectrum information of the nanomaterial under a polarization detection state; comparing the Raman spectrum information under the non-polarization detection state with the Raman spectrum information under the polarization detection state, so as to obtain change information of a Raman characteristic peak at a specific position in the Raman spectrum; and performing coding according to one or more of the change information of the Raman characteristic peak at the specific position in the Raman spectrum to obtain a secondary-code.

Optionally, the change information of the Raman characteristic peak at the specific position includes change information of a peak presence state, shifting information of a peak position, change information of a peak intensity, or change information of a peak FWHM of the Raman characteristic peak at the specific position.

Optionally, each of the specific positions corresponds to one bit in the secondary-code, and the change information at the specific position is used to represent a binary value of a bit corresponding to the specific position.

Optionally, the change information of the Raman characteristic peak includes change information of a peak presence state, shift information of a peak position, change information of a peak intensity, or change information of a peak FWHM of the Raman characteristic peak at the specific position; when the change information at the specific position includes the change information of the peak presence state, variance and disappearance of the Raman characteristic peak respectively represent "0" and "1" of the binary digits; when the change information at the specific position includes the shift information of the peak position, a blue shift and non-shift/red shift of the peak position of the Raman characteristic peak respectively represent "1" and "0" of the binary digits; when the change information at the specific position includes the change information of the peak intensity, increase and variance/decrease of the peak intensity of the Raman characteristic peak respectively represent "1" and "0" of the binary digits; and when the change information at the specific position includes the change information of the FWHM, increase and variance/decrease of the peak FWHM of the Raman characteristic peak respectively represent "1" and "0" of the binary digits.

According to still another aspect, the present disclosure further provides another polarized Raman spectrum coding-based nano barcode smart label including: a substrate and a nanomaterial coding layer that is provided on the substrate and can be coded by polarized Raman spectrum coding, characterized in that a coding carrier of the nanomaterial coding layer is formed by a mixture of a group of nanomaterials, wherein some or all of Raman characteristic peak states of the nanomaterials can exhibit obvious polarization characteristics under different polarization detection states.

Optionally, the coding carrier of the nanomaterial coding layer is formed by a group of nanomaterials, wherein when some or all of Raman characteristic peaks of the nanomaterials are compared with a Raman characteristic peak under a non-polarization detection state, the Raman characteristic peak states at a specific position exhibit obvious polarization characteristics under different polarization detection states.

Optionally, the Raman characteristic peak states at the specific position includes a peak presence state, a peak position shift state, a peak intensity change state, and a peak FWHM of a Raman characteristic peak at the specific position.

Optionally, the nanomaterials presenting obvious polarization characteristics include one or a mixture of $Ge_xSi_{1-x}$ alloy nanoparticles, $SnO_2$ nanoparticles, $CaF_2$ nanoparticles, $Y_2O_3$ nanoparticles, ZnO nanoparticles, Si nanoparticles, $SnO_2$ nanoparticles, and SiC nanoparticles.

Optionally, the substrate is one of paper products, plastic, textile, wood, bamboo timber, glass, and metal materials.

Optionally, the nanomaterial coding layer that can be coded by polarized Raman spectrum coding is assembled onto the substrate in the form of a one-dimensional barcode or a two-dimensional code by at least one of titration, printing, coating and industrial printing.

According to yet another aspect, the present application further provides another coding method of a nano barcode based on polarized Raman spectrum coding, including: firstly, obtaining Raman spectrum information of a nanomaterial used for coding under a non-polarization detection state, so as to obtain a primary code; then obtaining Raman spectrum information of the nanomaterial used for coding under different polarization detection states; comparing the two kinds of information according to an XOR method, collecting change information, and performing coding according to one or more of the change information to obtained a secondary-code.

Optionally, the change information includes a peak presence state, a peak position shift state, a peak intensity change state, and a peak FWHM of a Raman characteristic peak at the specific position.

Optionally, the change information is expressed by different binary digits.

Optionally, the change information is expressed by different binary digits, the peak presence state, i.e. invariance and disappearance respectively represent "0" and "1" of the binary digits, the peak position shift state, i.e. blue shift and non-shift/red shift respectively represent "1" and "0" of the binary digits, the peak intensity change state, i.e. increase and invariance/decrease of the peak intensity respectively represent "1" and "0" of the binary digits, and the peak FWHM, i.e. increase and invariance/decrease of the peak FWHM respectively represent "1" and "0" of the binary digits.

Compared with the prior art, the present disclosure has the following beneficial technical effects:

1. Compared with a conventional spectral coding method, the coding method provided by the present disclosure enables codes to have the same shape, allows for multiple coding without an extra physical space, is more hidden, and has better anti-counterfeiting function.

2. The present disclosure can make use of the characteristics of polarized Raman spectrum to code the optical properties of the Raman spectrum of the material in more dimensions, thereby improving information capacity and coding modes of the original Raman spectrum nano barcode.

3. A plurality of novel Raman spectrum characteristics may be achieved by combining polarized Raman spectrums of materials that are differently prepared/regulated, so that the Raman barcode coding may exhibit more regulable capacity.

4. The coding method of the present disclosure can use a very small amount of nanomaterials to carry sufficient fixed coded information, and can be used on a surface of various objects with wide selection of raw materials, low cost and easy production.

DESCRIPTION OF THE EMBODIMENTS

Figure 1:
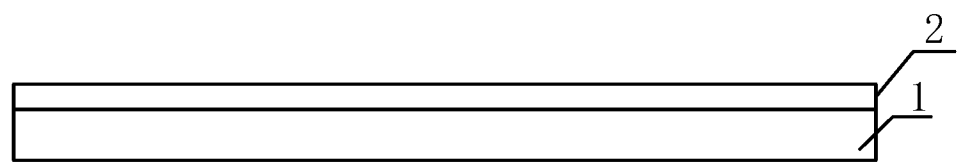
FIG. 1 is a schematic structural diagram of a polarized Raman spectrum-based nano barcode smart label.

The present disclosure will be described in detail below in conjunction with embodiments and the drawings, but the present disclosure is not limited to the embodiments and the drawings.

A conventional barcode is a graphic identifier that is coded by using bars and spacings with different widths and reflectivity according to a certain coding rule (code system), and is used to express a group of numerical or alphabetic symbol information.

A conventional Raman spectrum-based nano barcode is composed of a substrate and a nanoparticle coding layer that is provided on the substrate and can be coded by Raman spectrum coding, wherein the nanoparticle coding layer that can be coded by Raman spectrum coding is a mixed layer including a plurality of nanomaterials with different Raman characteristic peaks. The mixed layer is formed by mixing a plurality of kinds (e.g., 1-10 kinds) of nanoparticles with independent distinguishable Raman characteristic spectra, that is, the Raman characteristic spectra of different nanoparticles can be distinguished, distributions of spectrum peaks at different positions in the Raman spectra of different nanoparticles represent different binary digits, and presence or absence of the peak represent "1" or "0" in the binary digits. Different binary coding information can be obtained by adjusting the type of the nanoparticles included in the mixed layer.

In addition to the peak position (frequency), Raman spectral properties of a nanoparticle also includes FWHM and peak intensity; in particular, Raman spectrum of a nanoparticle has unique polarization characteristics, that is, a parameter of depolarization degree may be used to measure the symmetry of a constituent solid molecule, so information related to a molecular structure may be further obtained. Incident (excitation) light of a Raman spectrum is laser light, and laser light is polarized light. When the laser light interacts with a sample molecule, Raman scattered light presents different polarization characteristics in different directions due to anisotropy of the Raman polarizability. For nanoparticles of the same material, different Raman spectrum characteristics can be obtained via different polarization detection.

If a polarization direction of the incident light is selected, two polarization directions of the scattered light, i.e., directions that are respectively perpendicular to and parallel to the polarization direction of the incident light, can be set by using a half-wave plate, so that two intensities $I_\perp$ and $I_\parallel$ of the scattered light are respectively measured; a degree of depolarization is designated as ρ, where $$\rho = \frac{I_\perp}{I_\parallel}.$$

The degree of depolarization ρ is related to the degree of anisotropy of the polarizability of the solid molecule, for example, if the isotropy part is labeled as a, and the anisotropy part is labeled as b, then $\rho=3b^2/(45a^2+4b^2)$.

For spherically symmetric vibration, b=0, and ρ=0. The smaller the ρ is, the higher the degree of the symmetry is. For an anisotropic molecule, a=0, and ρ=¾. For non-fully symmetric vibrating molecules, ρ is ranged between 0-¾, so the symmetry of a solid particle molecule vibration can be determined by measuring the degree of depolarization ρ of the Raman spectrum. Similarly, it is also possible to perform coding by using nanomaterials with different synthesized structural symmetry, and obtain Raman spectra under different degrees of polarization by adjusting the coding materials in nano barcode. That is, for a specific material, even a same group of coding materials is used, different Raman spectra with different Raman characteristic peak states can be obtained under different polarization detection states. Many new properties and new unique coding forms may be obtained by using these Raman spectra coding different from those of an ordinary bulk material. Here, the different polarization detection states may refer to states under excitation by different polarized lights, wherein the different polarized lights may refer to polarized lights having different polarization angles, and also may refer to polarized light and unpolarized light.

Due to the anisotropy of a medium, when light propagates in the solid, lights scattered will be polarized. By using a specific experimental geometric configuration, certain vibration modes can be selectively excited, and corresponding Raman peaks may be obtained. For materials of the same type, by adjusting a polarization analyzer, a totally different Raman spectrum from a Raman spectrum detected under a non-polarization state can be obtained. Especially for a Raman spectrum of a low-dimensional nanometer system, when the size of nanocrystal is reduced, impurities or defects are introduced, and a surface morphology is changed, a series of new Raman properties that are different from those of the conventional bulk materials will be induced. For example:

due to the destruction of translational symmetry and momentum dispersion ($\Delta q \approx h/\Delta r$) of the nanomaterial, relaxation of a selection rule of q=0 for the Raman spectrum occurs, all phonons within a range of a wave vector $\Delta q$ can participate in the Raman scattering process, resulting in asymmetric broadening and shifting towards a low frequency of the Raman vibration mode, that is, the so-called phonon confinement effect.

Due to large specific surface area, surface atomic bonding and the presence of various vacancies/interstitial atoms of nanomaterials, new vibrational modes (defect modes, interstitial modes, etc.) that are not available in bulk materials will be generated; or new vibrational modes may be generated because large localized electric fields are generated from atomic displacements, causing a non-Raman activity mode in a larger crystal to turn into Raman activity mode or a degenerate mode therein is degenerated; or, a weaker longitudinal phonon (LO) mode may undergo a large intensity enhancement due to interactions with the surface plasmon.

When a particle size is reduced to less than 50 nm, and a condition where $qR \leq 1$ (q is the wave vector of the phonon, and R is a radius of the particle) is satisfied, due to the Frohlich interaction, a relatively stronger Frohlich surface mode will be produced around optical phonon frequency; when the size of a particle is generally less than 10 nm, due to a large surface elastic vibration, a surface acoustical phonon mode will be produced, with frequencies generally low than 100 cm$^{-1}$ and significant polarization characteristics as well as dependence on particle morphology.

During processing and growth of the nanomaterials, outer atoms of a crystal grain often interact with adjacent atoms and are subjected to steep thermochemical gradients, creating new phases which induce new Raman spectra.

The above factors are often ignored or cannot be detected in Raman spectra of a bulk material, but often contribute significantly to Raman spectra in nanomaterials. Meanwhile, detailed spectroscopic information of these new Raman characteristics can be obtained by combining the changes in the peak position, the FWHM, and the intensity with the Raman spectra. On the other hand, by controlling the type and structure of the nanomaterial and coding the nanomaterial, detailed information can be obtained through a polarized Raman spectrum, that is, Raman spectrum information that is different from that of the conventional bulk material can be obtained. Secondary coding is performed on such a polarized Raman spectrum, so a secondary-coding of a nanomaterial according to the present disclosure can be formed.

A secondary coding of the nanomaterial means that under excitation of polarized (or unpolarized) light for the nanomaterial used for coding, different polarization detection is applied for scattered lights, so as to obtain obvious changes in a peak presence state, a peak shift state, a peak intensity change state, and a FWHM change state at a specific position in a Raman spectrum of the nanomaterial used for coding, and coding is performed by using one or more of these changed information. That is, under the excitation of different polarized (or unpolarized) light to the nanomaterial used for secondary coding, the presence or absence of a Raman characteristic peak, or possible obvious changes in a peak position of the Raman characteristic peak, a peak intensity of the Raman characteristic peak, or an FWHM of the Raman characteristic peak may be obtained, and the presence or absence of the Raman characteristic peak, and the changes in the peak position of the Raman characteristic peak, the peak intensity of the Raman characteristic peak, and the FWHM of the Raman characteristic peak in the Raman spectrum under different polarization detection states can be used as information for coding. Here, the obvious changes defined here are changes that can be detected by detection devices and that are distinguishable.

A conventional spectrum coding technology mainly uses the presence or absence of a spectrum peak. In fluorescence spectral coding methods, in some circumstances, changes in peak intensity are considered, without taking changes in FWHM or polarization characteristics of a spectrum into consideration. However, in most spectroscopy, for example, due to anisotropy of a material structure and different morphologies of particles, spectral characteristics of Raman, fluorescence, or infrared spectrum will present a specific polarization state.

A position of a polarized Raman peak of a nanomaterial can be obtained by changing a structure and properties of the nanomaterial and then combining polarization characteristics of incident light and scattered lights.

As shown in FIG. 1, the polarized Raman spectrum coding-based nano barcode smart label includes: a substrate 1 and a nanoparticle coding layer 2 that is provided on the substrate 1 and can be coded by polarized Raman spectrum coding.

Primary coding for the smart label is similar to a conventional Raman spectrum coding, where the nanoparticle coding layer is formed by mixing a plurality of kinds of nanoparticles with independent distinguishable Raman characteristic spectra, wherein arrangements of spectrum peaks at different positions in the Raman spectra of different nanoparticles represent different binary digits, and the presence and absence of a peak represent "0" and "1". That is, one predetermined position in the Raman spectrum corresponds to one bit of binary digits information, the presence or absence of a Raman characteristic peak at the predetermined position represents a value of the bit; the presence of the Raman characteristic peak corresponds to a value of "1" for the binary digit, and the absence of the Raman characteristic peak corresponds to a value of "0" for the binary digit; or, the presence of the Raman characteristic peak corresponds to a value of "0" for the binary digit, and the absence of the Raman characteristic peak corresponds to a value of "1" for the binary digit.

Figure 2:
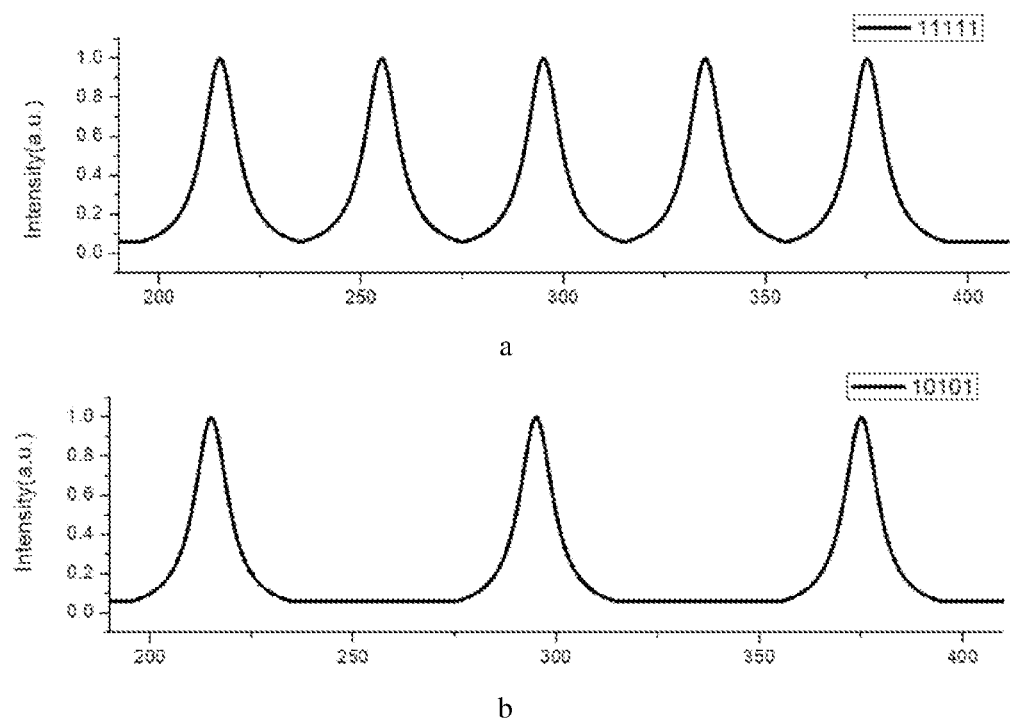
FIG. 2 is a schematic diagram of a common Raman spectrum coding.

Because the contained nanoparticles that can be coded by Raman spectrum have different Raman peak positions, when different nanoparticles are combinedly used, a series of different Raman images can be produced in the spectrum, these "different Raman images" corresponding to respective "nanoparticle combinations" form different digital codes, and information may be stored by codes. The information can be read and identified by Raman detection devices. Therefore, the primary code is coded by using the arrangements of spectrum peaks at different positions in the Raman spectra of the nanoparticles of the coding layer to represent different binary digits, and the presence and absence of the peak represent a value of "1" and "0" of the binary digits, as shown in FIG. 2. FIG. 2 (a) and FIG. 2 (b) show different schematic diagrams of Raman spectrum coding by using different nanoparticles.

Figure 3:
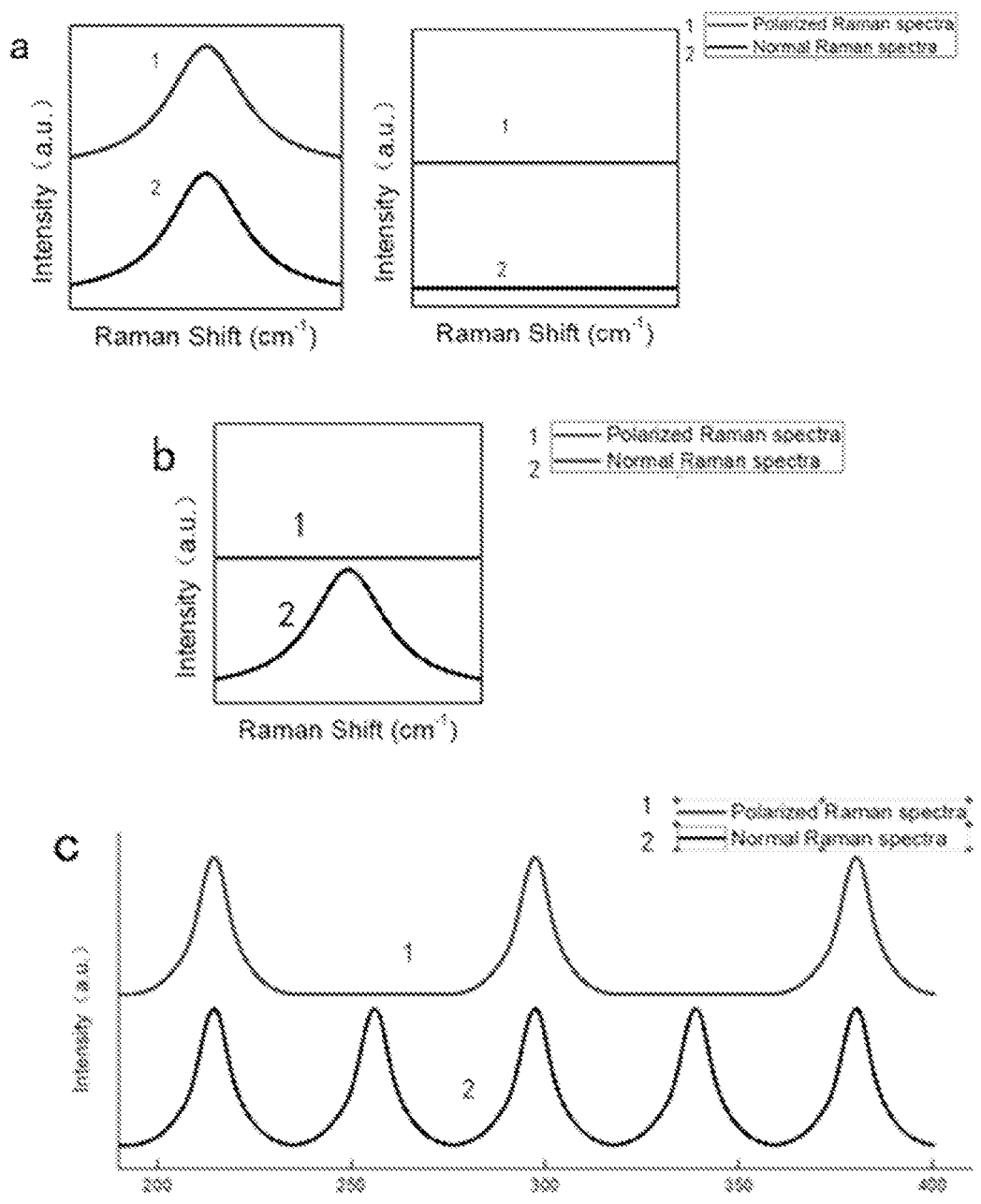
FIG. 3 is a schematic coding diagram showing peak presence states of a Raman characteristic peak under a polarization state and a non-polarization state.

In secondary coding for the smart label, the changes of Raman spectra of nanomaterials under different depolarization detection states are used for coding, wherein the code is compared with a code given by Raman spectra measured in a non-polarization detection state, and a secondary-code is obtained by using an XOR method. Specifically, the following specific embodiments are included:

Embodiment 1 Coding According to Retainment and Disappearance of a Certain Peak Under the Polarization State FIG. 3 is a schematic coding diagram of a peak presence state of a Raman characteristic peak under a polarization state (Curve 1) and a non-polarization state (Curve 2), wherein diagram (a) is a schematic diagram illustrating retainment of the Raman peak under the polarization state and the non-polarization state, diagram (b) is a schematic diagram illustrating a change (disappearance) of the Raman peak under the polarization state and the non-polarization state, and diagram (c) illustrates a secondary coding using a peak presence state at a specific position of the Raman characteristic peak under the polarization state and the non-polarization state.

A state code of specific position can be obtained by using the peak presence states at the specific position of the Raman spectrum detected under the non-polarization detection state and the Raman spectrum under the polarization detection state through the XOR method, and the obtained state code is a secondary-code under the polarization detection state.

If a Raman peak at a certain position under the polarization detection state remains, that is, the Raman peak exists originally (under the non-polarization detection state or other polarization detection states), and still exists under the polarization detection state, or a Raman peak is not measured at this position (under the non-polarization detection state or other polarization detection states) originally and is still not measured under the polarization detection state, a coding state of the position obtained according to the XOR method is 0, as shown in FIG. 3a.

If a Raman peak at a certain position under the polarization detection state changes, that is, the Raman peak originally exists, but disappears under the polarization detection state, a coding state of the position obtained according to the XOR method is 1, as shown in FIG. 3b.

According to a combination of the above rules, a code of a group of the peaks can be obtained as follows: if a code of an ordinary (under the non-polarization detection state) Raman peak is 11111, and a presence state of the Raman peak under the polarization detection state is 10101, then a secondary-code under the polarization detection state based on an XOR result is 01010, as shown in FIG. 3c.

Figure 4:
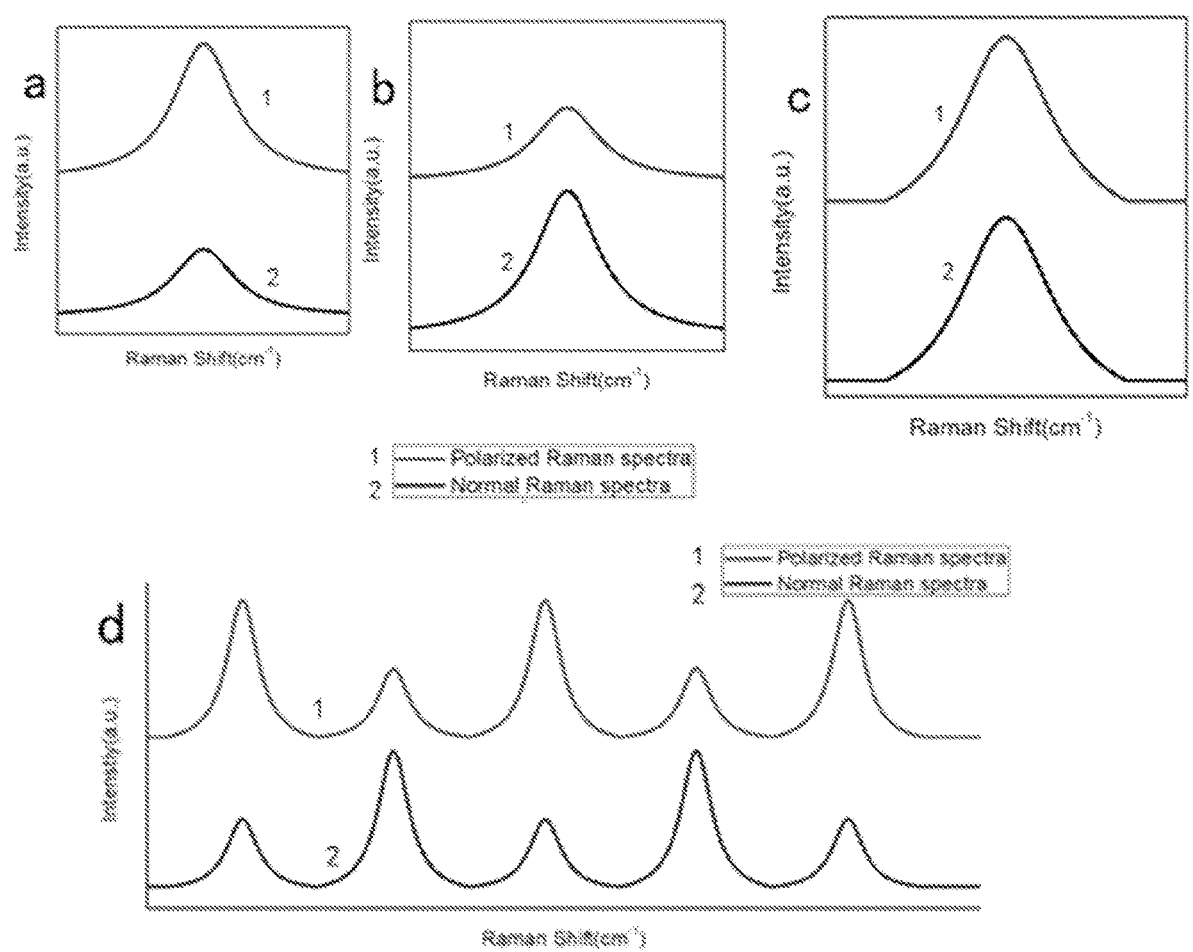
FIG. 4 is a schematic coding diagram showing peak intensity change of a Raman characteristic peak under a polarization state and a non-polarization state.

Embodiment 2 Coding According to a Change in Relative Intensity of Each Peak Under a Polarization Detection State FIG. 4 is a schematic coding diagram of a peak intensity change state of a Raman characteristic peak under a polarization state (Curve 1) and a non-polarization state (Curve 2), wherein diagram (a) shows increase of the Raman peak under the polarization state over the non-polarization state, diagram (b) shows decrease of the Raman peak under the polarization state with respect to the non-polarization state, diagram (c) shows invariance of peak intensity of the Raman characteristic peak under the polarization state and the non-polarization state, and diagram (d) shows secondary coding according to the peak intensity change state at a specific position of the Raman characteristic peak under the polarization state and the non-polarization state.

Coding is performed according to a change in an intensity of a Raman peak at a specific position in a Raman spectrum detected under the non-polarization detection state and a Raman spectrum under the polarization detection state, increase of the intensity of the polarized Raman characteristic peak relative to the intensity of the Raman peak under the non-polarization detection state is represented as 1, as shown in FIG. 4a, while decrease or invariance of the intensity is represented as 0 (see FIG. 4b and FIG. 4c), thus a state code obtained by the XOR method is a secondary-code under the polarization detection state.

According to a combination of the above rules, a code of a group of polarized Raman peaks in FIG. 4d can be obtained as follows: intensity states of polarized Raman peaks at five positions relative to intensity states of unpolarized peaks are increase, decrease, increase, decrease, and increase, respectively, so a corresponding secondary-code under the polarization detection state is 10101.

Figure 5:
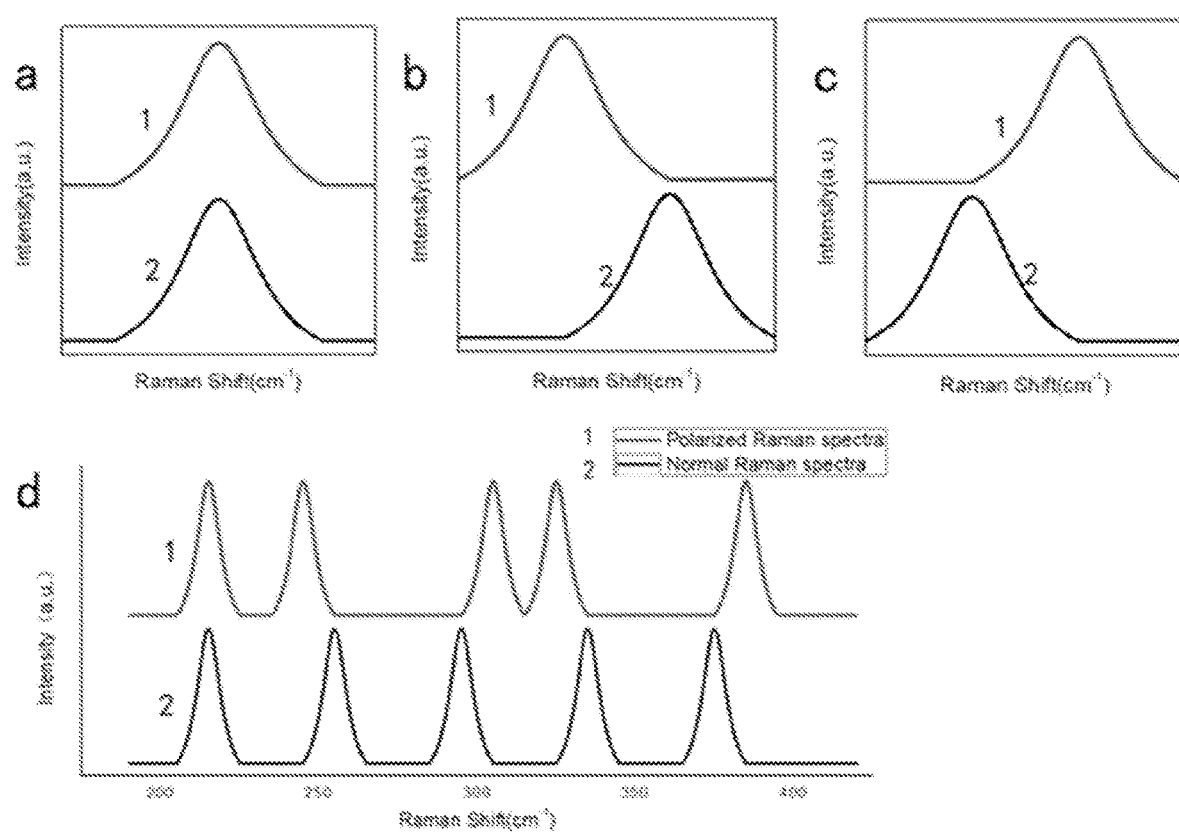
FIG. 5 is schematic coding diagram showing peak shift of a Raman characteristic peak under a polarization state and a non-polarization state.

Embodiment 3 Coding According to a Shift State of a Peak Position Under a Polarization Detection State FIG. 5 is a schematic coding diagram of a peak position shift state of a Raman characteristic peak under a polarization state (Curve 1) and a non-polarization state (Curve 2), wherein diagram (a) shows an invariance of peak position of the Raman peak under the polarization state and the non-polarization state, diagram (b) show a red shift of the Raman peak position under the polarization state and the non-polarization state, diagram (c) shows a blue shift of the Raman peak position under the polarization state and the non-polarization state, and diagram (d) shows secondary coding according to the peak position shift state at a specific position of the Raman characteristic peak under the polarization state and the non-polarization state.

Coding is performed according to a shift of peak position of a Raman peak at a specific position in a Raman spectrum detected under the non-polarization detection state and a Raman spectrum under the polarization detection state. A red shift or non-shift state of the peak position of the polarized Raman peak relative to the peak position of the unpolarized Raman peak is represented as 0, i.e., FIG. 5a and FIG. 5b. A blue shift state of the peak position of the polarized Raman peak relative to the peak position of the unpolarized Raman peak is represented as 1, i.e., FIG. 5c.

According to a combination of the above rules, a code of a group of polarized Raman peaks in FIG. 5d can be obtained as follows: peak positions at five positions are un-changed, red shift, blue shift, red shift, and blue shift, respectively, so a corresponding secondary-code under the polarization detection state is 00101.

Figure 6:
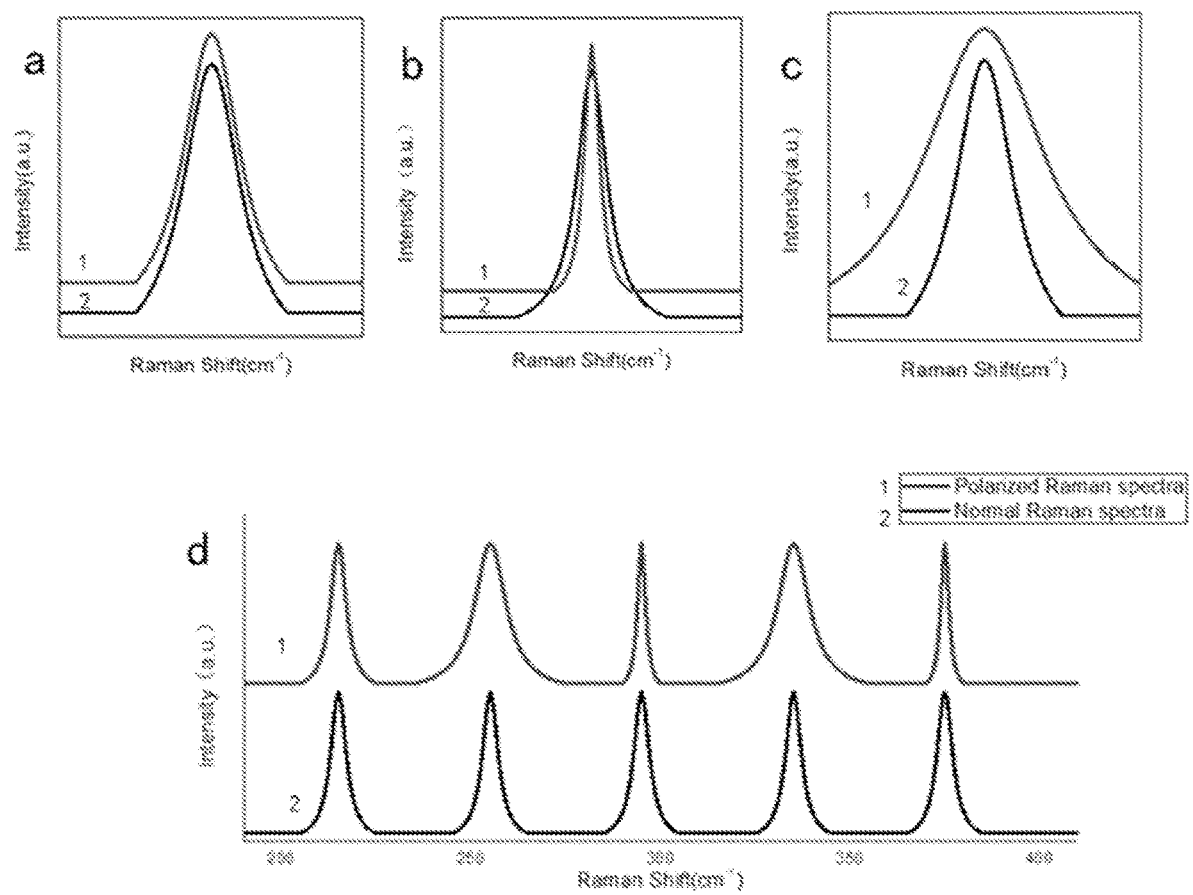
FIG. 6 is schematic coding diagram showing FWHM change of a Raman characteristic peak under a polarization state and a non-polarization state.

Embodiment 4 Coding According to a Change in Peak Width Under a Polarization Detection State FIG. 6 is schematic coding diagram of a peak FWHM change state of a Raman characteristic peak under a polarization state (Curve 1) and a non-polarization state (Curve 2), wherein diagram (a) shows an invariance of an FWHM of the Raman peak under the polarization state and the non-polarization state, diagram (b) shows a decrease of the FWHM of the Raman peak under the polarization state and the non-polarization state, diagram (c) shows an increase of the FWHM of the Raman peak under the polarization state and the non-polarization state, and diagram (d) shows secondary coding according to a change of peak FWHM at a specific position of the Raman characteristic peak under the polarization state and the non-polarization state.

Coding is performed according to a change in an FWHM of a Raman spectrum at a specific position in a Raman spectrum detected under a non-polarization detection state and a Raman spectrum under a polarization detection state. An algorithm is used to normalize Raman peak data and then whether the FWHM is changed is calculated. Both an invariance and decrease of the FWHM are represented as 0, as shown in FIGS. 6a and 6b. An increase of the FWHM is represented as 1, as shown in FIG. 6c.

According to a combination of the above rules, a code of a group of polarized Raman peaks in FIG. 6d can be obtained as follows: FWHM of vibration peaks at five positions are invariance, increase, decrease, increase, and decrease, respectively, so a corresponding secondary-code under the polarization detection state is 01010.

In order to further illustrate the technical content of the present disclosure, polarized Raman spectrum coding will be illustrated below by specially taking a practical application as an example in conjunction with FIG. 7

In the present example, total 8 kinds of nanomaterials are used as coded materials of a coding layer, which are respectively $Ge_xSi_{1-x}$ alloy (Silicon germanium alloy) nanoparticles, $SnO_2$ nanoparticles, $CaF_2$ nanoparticles, $Y_2O_3$ nanoparticles, ZnO nanoparticles, Si nanoparticles, $SnO_2$ nanoparticles, and SiC nanoparticles. First, peak positions of Raman spectrum characteristic peaks of the coding materials are measured, and the measurement results are shown in FIG. 7a. According to a rule that arrangements of spectrum peaks at different positions in Raman spectra of different nanomaterials represent different binary digits, the presence and absence of a peak represent "1" and "0" of the binary digits. Here, Raman characteristic peaks are presented at all eight positions, so in FIG. 7a, a primary code, i.e., an ordinary Raman coded information is "11111111".

Next, a Raman spectrum of the coding layer is measured under a polarization detection state, and a measurement result under the polarization detection state is shown in FIG. 7b. A peak presence state, a peak shift state, a change state of the peak intensity, and a change state of the FWHM of the peak of each characteristic peak in the Raman spectrum under the polarization detection state and the non-polarization detection state are determined by a predetermined algorithm, so new coding information is obtained.

When existence information of a polarized peak is used for determination, since all of the polarized Raman peaks at eight positions exist, the presence states of the polarized peaks are represented as "11111111", according to an XOR result; in this case, secondary coding information of the peak presence states of the coding materials under the polarization detection state would be "00000000".

When shifting information of a polarized peak is used for determination, the shifting states of Raman peaks at 8 positions are respectively red shift, non-shift, red shift, red shift, blue shift, blue shift, non-shift, and red shift; according to a rule where a red shift of a peak represents "0", a non-shift represents "0", and a blue shift represents "1", secondary coding information of the peak position shift states of the coded materials under the polarization detection state would be "00001100".

When an FWHM information of a polarized Raman peak is used for determination, the FWHM states of the Raman peaks at 8 positions are respectively decrease, invariance, invariance, decrease, increase, increase, increase, and decrease, according to a rule where a decrease of an FWHM represents "0", an invariance represents "0", and an increase represents "1", secondary coded information of the peak FWHM of the coded materials under the polarization detection state would be "00001110".

When intensity information of a polarized peak is used for determination, intensity states of the 8 characteristic Raman peaks are respectively decrease, invariance, decrease, increase, decrease, decrease, invariance, and increase; according to a rule where an invariance of a peak intensity represents "0", a decrease represents "0", and an increase represents "1", secondary coded information of the change state of the peak intensity of the coded materials under the polarization detection state would be "00010001".

Figure 7:
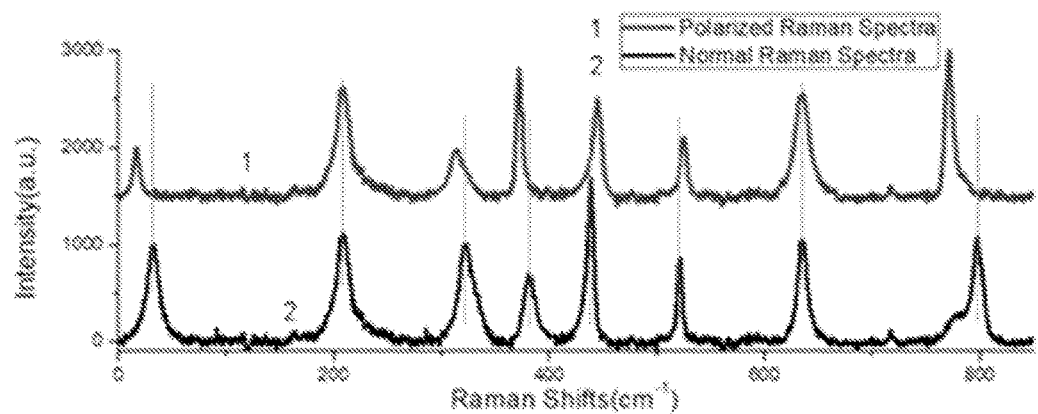
FIG. 7 is a schematic secondary-coding diagram of a Raman spectrum and a polarized Raman spectrum where eight kinds of nanoparticles are used in a coding layer.

In a practical application, a secondary-code of the coding materials under the polarization detection state shown in FIG. 7 can be obtained by using one of coding information in the above four kinds of secondary coding, or by using a combination of the coding information in the four kinds of secondary coding; compared with conventional Raman spectrum coding that uses the presence and absence of a peak to represent "1" and "0" for coding, an information capacity of the code provided by the present disclosure is significantly increased, and a better anti-counterfeiting function is achieved.

While the invention has been described in terms of preferred embodiments, it is not intended to be limited thereto. Various alterations and modifications will occur to those skilled in the art without departing from the spirit and scope of the invention. Therefore, the scope of protection of the invention shall be defined by the appended claims.

What is claimed is:

1. A polarized Raman spectrum coding-based nano barcode smart label, comprising:
    a substrate and a nanomaterial coding layer that is provided on the substrate and can be coded by polarized Raman spectrum coding,
    wherein the nanomaterial coding layer comprises a coding carrier that is formed by a mixture of a group of nanomaterials, and Raman characteristic peak states of the nanomaterials under different polarization detection states exhibit distinguishable polarization characteristics,
    wherein
    a Raman characteristic peak state at a specific position exhibits distinguishable polarization characteristics when a Raman spectrum of the nanomaterials under a polarization detection state is compared with a Raman spectrum under a non-polarization detection state; or
    a Raman characteristic peak state at a specific position exhibits distinguishable polarization characteristics when Raman spectra of the nanomaterials under different polarization detection states are compared with each other.

2. The smart label according to claim 1, wherein the distinguishable polarization characteristics of the Raman characteristic peak state at specific positions in the Raman spectrum comprise:
    a change of presence state, a shift of peak position, a change of peak intensity, or a change of peak FWHM of the Raman characteristic peak at the specific position in Raman spectrum information.

3. The smart label according to claim 1, characterized in that the nanomaterials comprises one or more of SiGe alloy nanoparticles, $SnO_2$ nanoparticles, $CaF_2$ nanoparticles, $Y_2O_3$ nanoparticles, ZnO nanoparticles, Si nanoparticles, $SnO_2$ nanoparticles, and SiC nanoparticles.

4. The smart label according to claim 1, characterized in that the substrate is one of paper products, plastic, textile, wood, bamboo, glass, and metal materials.

5. The smart label according to claim 1, characterized in that the nanomaterial coding layer that can be coded by polarized Raman spectrum coding is assembled onto the substrate in the form of a one-dimensional barcode or a two-dimensional code by at least one of titration, printing, coating and printing.

6. A coding method of a nano barcode based on polarized Raman spectrum coding, comprising:
   obtaining Raman spectrum information of a nanomaterial used for coding in a nano barcode smart label under a non-polarization detection state;
   obtaining Raman spectrum information of the nanomaterial under a polarization detection state;
   comparing the Raman spectrum information under the non-polarization detection state with the Raman spectrum information under the polarization detection state, so as to obtain change information of a Raman characteristic peak at a specific position in the Raman spectrum; and
   performing coding according to one or more of the change information of the Raman characteristic peak at the specific position in the Raman spectrum for obtaining a secondary-code.

7. The coding method according to claim 6, wherein the change information of the Raman characteristic peak at the specific position comprises change information of a peak presence state, shifting information of a peak position, change information of a peak intensity, or change information of a peak FWHM of the Raman characteristic peak at the specific position.

8. The coding method according to claim 6, characterized in that each of the specific positions corresponds to one bit in the secondary-code, and the change information at the specific position is used to represent a binary value of a bit corresponding to the specific position.

9. The coding method according to claim 6,
   wherein the change information of the Raman characteristic peak comprises change information of a peak presence state, shift information of a peak position, change information of a peak intensity, or change information of a peak FWHM of the Raman characteristic peak at a specific position;
   when the change information at the specific position comprises a change information of the peak presence state, invariance and disappearance of the Raman characteristic peak respectively represent "0" and "1" of the binary digits;
   when the change information at the specific position comprises a shift information of the peak position, a blue shift and non-shift/red shift of a peak position of the Raman characteristic peak respectively represent "1" and "0" of the binary digits;
   when the change information at the specific position comprises a change information of the peak intensity, increase and invariance/decrease of the peak intensity of the Raman characteristic peak respectively represent "1" and "0" of the binary digit; and
   when the change information at the specific position comprises a change information of the FWHM, increase and invariance/decrease of the peak FWHM of the Raman characteristic peak respectively represent "1" and "0" of the binary digit.

* * * * *